(12) United States Patent
Black et al.

(10) Patent No.: US 8,717,467 B2
(45) Date of Patent: May 6, 2014

(54) IMAGING SYSTEMS WITH ARRAY CAMERAS FOR DEPTH SENSING

(75) Inventors: Robert A. Black, Milpitas, CA (US); Scott Smith, San Jose, CA (US); Peng Lin, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 209 days.

(21) Appl. No.: 13/149,818

(22) Filed: May 31, 2011

(65) Prior Publication Data

US 2012/0188420 A1 Jul. 26, 2012

Related U.S. Application Data

(60) Provisional application No. 61/435,943, filed on Jan. 25, 2011.

(51) Int. Cl.
*H04N 9/09* (2006.01)

(52) U.S. Cl.
USPC .......................................................... 348/265

(58) Field of Classification Search
USPC .......................... 348/262, 263, 264, 265, 279
See application file for complete search history.

(56) References Cited

U.S. PATENT DOCUMENTS

| | | |
|---|---|---|
| 5,727,242 A | 3/1998 | Lo et al. |
| 6,278,847 B1 | 8/2001 | Gharib et al. |
| 2004/0218291 A1 | 11/2004 | Fiete |
| 2007/0159535 A1* | 7/2007 | Kumagai et al. ........... 348/218.1 |
| 2008/0225420 A1 | 9/2008 | Barrows et al. |
| 2008/0278610 A1* | 11/2008 | Boettiger ....................... 348/273 |
| 2009/0051793 A1* | 2/2009 | Smith ........................... 348/266 |

OTHER PUBLICATIONS

A. Portnoy et al., "Design and characterization of thin multiple aperture infrared cameras", Applied Optics, Apr. 10, 2009, vol. 48, No. 11.

* cited by examiner

*Primary Examiner* — Albert Cutler
(74) *Attorney, Agent, or Firm* — Treyz Law Group; Louis R. Levenson; Michael H. Lyons (57) ABSTRACT

Electronic devices may include camera modules. A camera module may be formed from an array of lenses and corresponding image sensors. The array of image sensors may include three color image sensors for color imaging and a fourth image sensor positioned to improve image depth mapping. Providing a camera module with a fourth image sensor may increase the baseline distance between the two most distant image sensors, allowing parallax and depth information to be determined for objects a greater distance from the camera than in a conventional electronic device. The fourth image sensor may be a second green image sensor positioned at a maximal distance from the green color image sensor used for color imaging. The fourth image sensor may also be a clear image sensor, allowing capture of improved image depth information and enhanced image resolution and low-light performance.

11 Claims, 7 Drawing Sheets

IMAGING SYSTEMS WITH ARRAY CAMERAS FOR DEPTH SENSING

This application claims the benefit of provisional patent application No. 61/435,943, filed Jan. 25, 2011, which is hereby incorporated by reference herein in its entirety.

BACKGROUND

This relates generally to imaging devices, and more particularly, to imaging devices with multiple lenses and multiple image sensors.

Image sensors are commonly used in electronic devices such as cellular telephones, cameras, and computers to capture images. In a typical arrangement, an electronic device is provided with a single image sensor and a single corresponding lens. Some electronic devices use arrays of image sensors and corresponding lenses to gather image data. This type of system, which is sometimes referred to as an array camera, may be used to extend depth of focus, increase output resolution through super-resolution processing, and capture depth information from a scene.

In a conventional array camera, three image sensors associated with red, green, and blue color filters respectively are used to capture color images. Array cameras having red, green and blue image sensors sometimes use parallax differences due to the physical offset between image sensors to derive depth information from a scene. Array cameras having three image sensors are limited by relative color saturation and by the close proximity of the three image sensors in the amount depth information they can provide.

It would therefore be desirable to be able to provide improved imaging devices with array cameras.

DETAILED DESCRIPTION

Digital camera modules are widely used in electronic devices such as digital cameras, computers, cellular telephones, or other electronic devices. These electronic devices may include image sensors that gather incoming light to capture an image. The image sensors may include arrays of image pixels. The pixels in the image sensors may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
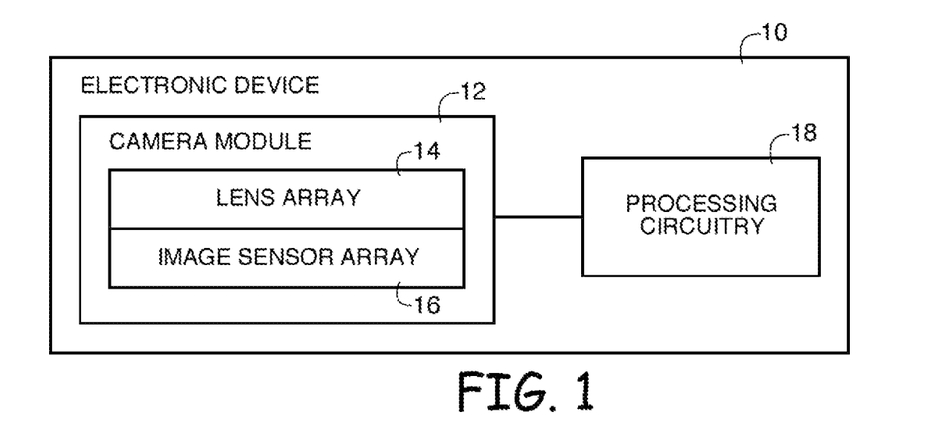
FIG. 1 is a diagram of an illustrative electronic device in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include an array of lenses 14 and a corresponding array of image sensors 16. Lenses 14 and image sensors 16 may be mounted in a common package and may provide image data to processing circuitry 18. Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Image sensor array 16 may contain an array of individual image sensors configured to receive light of a given color by providing each image sensor with a color filter. The color filters that are used for image sensor pixel arrays in the image sensors may, for example, be red filters, blue filters, and green filters. Each filter may form a color filter layer that covers the image sensor pixel array of a respective image sensor in the array. Other filters such as white color filters, dual-band IR cutoff filters (e.g., filters that allow visible light and a range of infrared light emitted by LED lights), etc. may also be used.

The image sensors may be formed on one or more separate semiconductor substrates. With one suitable arrangement, which is sometimes described herein as an example, the image sensors are formed on a common semiconductor substrate (e.g., a common silicon image sensor integrated circuit die). Each image sensor may be identical. For example, each image sensor may be a Video Graphics Array (VGA) sensor with a resolution of 480×640 sensor pixels (as an example). Other types of image sensor may also be used for the image sensors if desired. For example, images sensors with greater than VGA resolution or less than VGA resolution may be used, image sensor arrays in which the image sensors are not all identical may be used, etc.

The use of a camera module with an array of lenses and an array of corresponding image sensors (i.e., an array camera) having a red, green and blue image sensor may allow color images to be captured with increased spatial resolution due to the equal number of pixels of each color. Images captured using an array camera may also provide depth information about a real-world scene (e.g., an object may appear at a different position in images captured by different image sensors due to the physical offset between the image sensors in the image sensor array). Image data may be processed by processing circuitry 18 to extract depth information about a scene from the image data (e.g., the distance of an object from the rear of a car in an image captured by an automobile rear-view camera). Additional depth information may be obtained by adding an additional image sensor and an additional lens to the image sensors required for color imaging (e.g. single red, green, and blue image sensors). In comparison with conventional devices, array cameras having additional image sensors for image depth mapping may also provide improved signal-to-noise ratio, color fidelity, and parallax for image parallax corrections.

Processing circuitry 18 (e.g., processing circuitry integrated onto sensor array integrated circuit 16 and/or processing circuitry on one or more associated integrated circuits) can select which digital image data to use in constructing a final image and extracting image depth information for the user of device 10. For example, circuitry 18 may be used to blend image data from red, blue, and green sensors to produce full-color images, may be used to determine image parallax corrections, may be used to produce 3-dimensional (sometimes called stereo) images using data from two or more different sensors that have different vantage points when capturing a scene, may be used to produce increased DOF images using data from two or more image sensors, etc. In some modes of operation, all of the sensors on array 16 may be active (e.g., when determining 3-dimensional image depth information). In other modes of operation (e.g., color imaging), only a subset of the image sensors may be used. Other sensors may be inactivated to conserve power (e.g., their positive power supply voltage terminals may be taken to a ground voltage or other suitable power-down voltage and their control circuits may be inactivated or bypassed).

Figure 2:
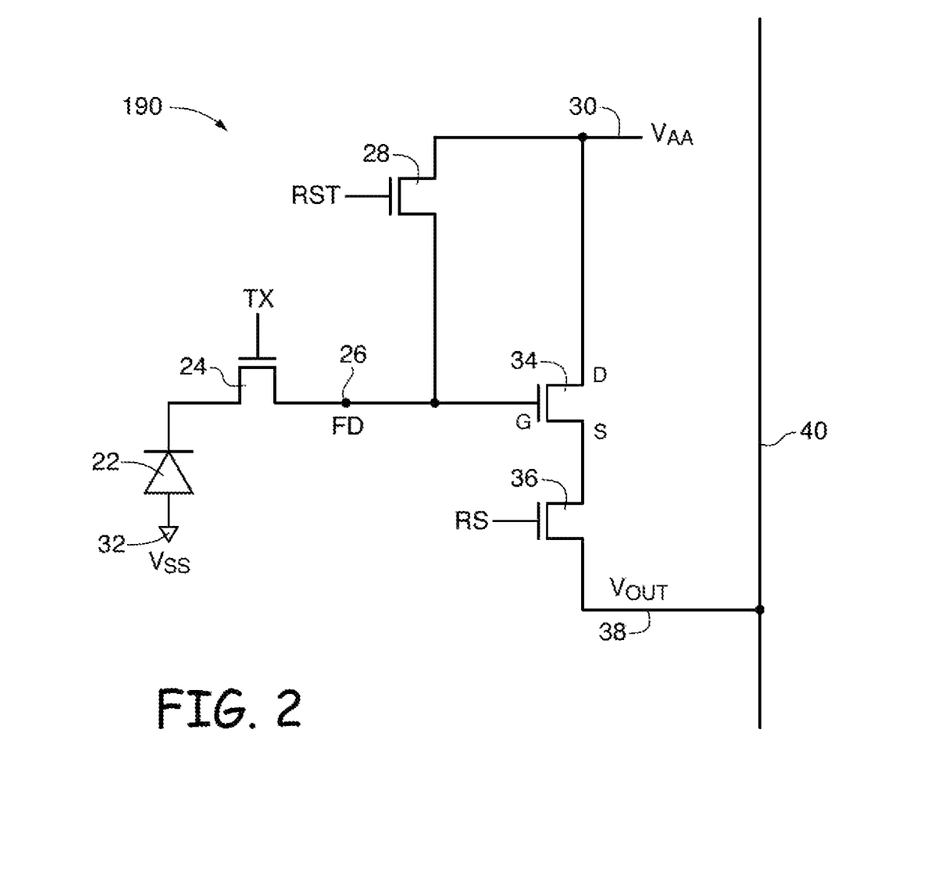
FIG. 2 is a diagram of an illustrative image sensor pixel in accordance with an embodiment of the present invention.

Circuitry in an illustrative pixel of one of the image sensors in sensor array 16 is shown in FIG. 2. As shown in FIG. 2, pixel 190 includes a photosensitive element such as photodiode 22. A positive power supply voltage (e.g., voltage Vaa) may be supplied at positive power supply terminal 30. A ground power supply voltage (e.g., Vss) may be supplied at ground terminal 32. Incoming light is collected by photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34.

When it is desired to read out the value of the stored charge (i.e., the value of the stored charge that is represented by the signal at the source S of transistor 34, row select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 140 in the image sensor pixel array of a given image sensor. A vertical conductive path such as path 40 can be associated with each column of pixels.

When signal RS is asserted in a given row, path 40 can be used to route signal Vout from that row to readout circuitry. If desired, other types of image pixel circuitry may be used to implement the image pixels of sensors 16-1, . . . 16-N. For example, each image sensor pixel 140 (see, e.g., FIG. 1) may be a three-transistor pixel, a pin-photodiode pixel with four transistors, a global shutter pixel, a time-of-flight pixel, etc. The circuitry of FIG. 2 is merely illustrative.

Figure 3:
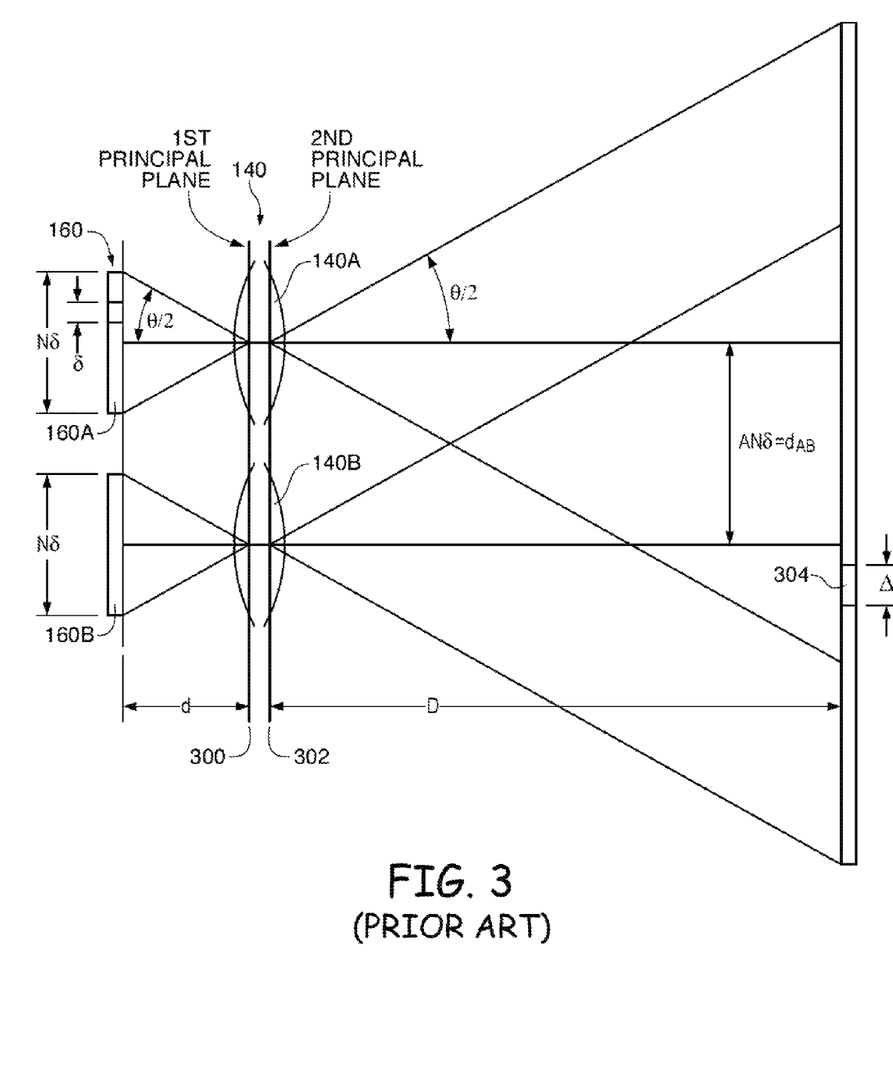
FIG. 3 is a diagram a portion of a conventional camera module arrangement in which the camera module includes two lenses and two image sensors.

A diagram of a portion of a conventional array camera with two identical lenses and two corresponding image sensors is shown in FIG. 3. In the example of FIG. 3, array camera has a lens array 140 that is made up of two lenses: lenses 140A and 140B. Lenses 140A and 140B each focus image light onto a respective image sensor in image sensor array 160. In particular, lens 140A may be used to focus image light onto image sensor 160A and lens 140B may be used to focus image light onto image sensor 160B. Lenses 140A and 140B have associated first and second principal planes 300 and 302 respectively. As shown in FIG. 3, determining the amount of parallax in multiple array camera systems requires determining the pixel image size A (i.e., the size of an image of a pixel in image sensors 160A or 160B).

Figure 4:
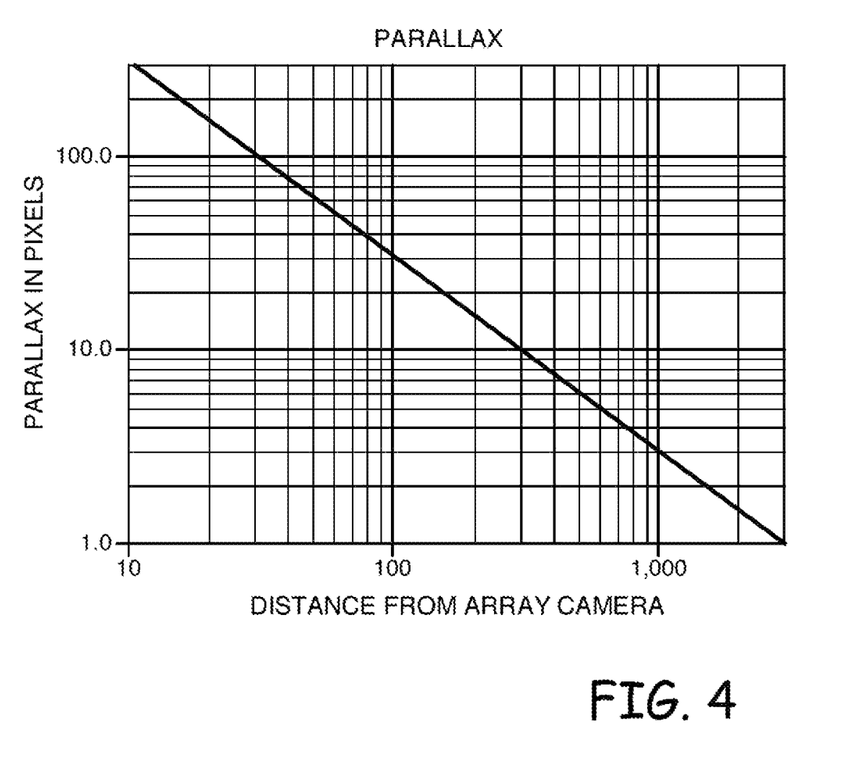
FIG. 4 is a diagram of an illustrative graph showing the dependence of parallax on the distance of an object from an array camera.

FIG. 3 shows schematically a cross-sectional side view of image sensor array 160, lens array 140 (including two lens principal planes 300 and 302) and projected pixel image 304. The total horizontal field of view of a single lens is θ degrees. FIG. 4 shows width δ of a single pixel in the image array, distance d from first principal plane 300 to the image array 160, distance D from second principal plane 302 to the pixel image 304, and pixel image size Δ is the size of the projected pixel image. N is the number of pixels across the width of the image array. Therefore, as indicated in FIG. 3, Nδ is equal to the width of each image array. Distance $d_{AB}$ between image sensors 160A and 160B can be written, as shown in FIG. 3, in terms of a parameter A which is the distance between image sensors 160A and 160B in units of image sensor width Nδ (i.e. $d_{AB}$=ANδ).

From Gaussian optics, the magnification of the pixel image is D/d, therefore the projected image of the pixel is:

$$\Delta = \frac{\delta D}{d}. \tag{1}$$

Trigonometric relations show that:

$$d = \frac{N\delta}{2\tan\left(\frac{\theta}{2}\right)}, \tag{2}$$

and therefore, substituting equation (2) into equation (1), the projected pixel image is:

$$\Delta = \frac{2D\tan\left(\frac{\theta}{2}\right)}{N}. \tag{3}$$

With an array camera of the type shown in FIG. 3, parallax information (and, if desired, 3-dimensional depth information) may be obtained from captured images. The parallax P between the arrays, in units of pixels, is equal to the distance between the arrays, divided by the projected pixel size Δ, where:

$$P = \frac{AN\delta}{\Delta} \quad (4)$$

Substituting in the definition of Δ in equation (3) into equation (4), $$P = \frac{A\delta N^2}{2D\tan\left(\frac{\theta}{2}\right)} \quad (5)$$

Since the spacing between arrays, the size of the pixels, the number of pixels and the lens field of view is fixed in an assembled device, parallax P of a given object varies inversely with the distance of the object from the array camera.

FIG. 4 shows the parallax (in pixels) for an object imaged by an exemplary array camera having two image sensors configured such that A=1.25, δ=1.4 um, N=1280 and θ=50 degrees. When parallax P of a given object is less than or equal to 1, then the object may be said to be in the "far-field" (or may be referred to as a far-field object) and no parallax correction may be required. In the example of array camera having two image sensors configured such that A=1.25, δ=1.4 um, N=1280 and θ=50 degrees, far-field objects have a distance greater than 3 meters. Array cameras may be designed to place the "far-field" where it is desired by changing the configuration of the array camera.

Far-field objects will appear in substantially the same position in images captured by image sensors 160A and 160B. Thus, image depth information may only be obtained for near-field objects in the "near-field" of the array camera (i.e., objects not in the far-field and having a parallax greater than 1).

Figure 5:
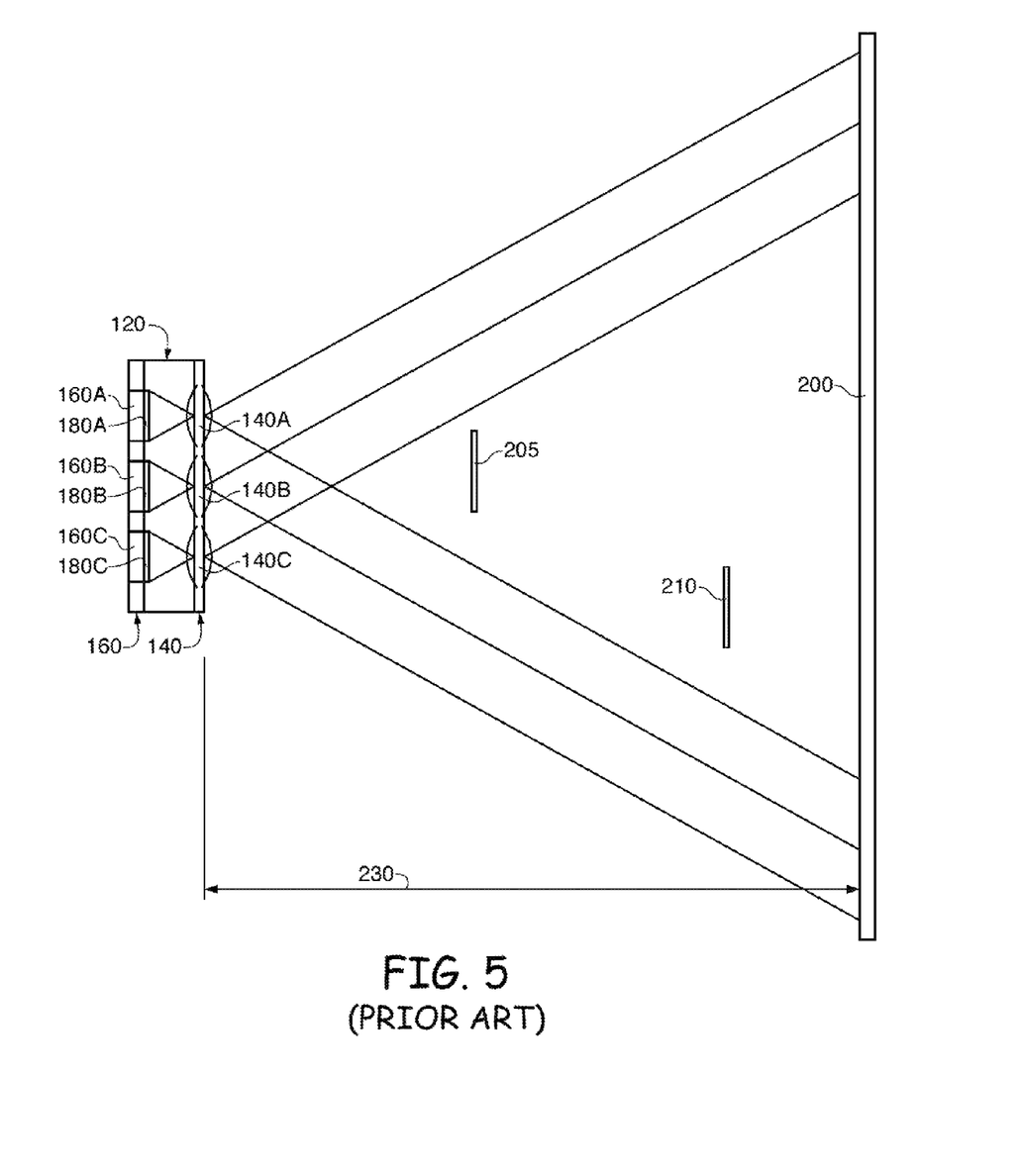
FIG. 5 is a diagram of a conventional camera module arrangement in which the camera module includes an array of lenses and corresponding image sensors.

A diagram of a conventional array camera with an array of identical lenses and corresponding image sensors having lens apertures of equal size is shown in FIG. 5. In the example of FIG. 5, array camera (camera module 120) has a lens array 140 that is made up of three lenses: lenses 140A, 140B, and 140C. Lenses 140A, 140B, and 140C each focus image light from an objects such as objects, 200, 205, and 210, onto a respective image sensor in image sensor array 160. In particular, lens 140A may be used to focus image light onto image sensor 160A, lens 140B may be used to focus image light onto image sensor 160B, and lens 140C may be used to focus image light onto image sensor 160C. Each image sensor is also associated with a color filter. In a typical arrangement, color filter 180A is a red color filter, color filter 180B is a green color filter, and color filter 180C is a blue color filter.

With an array camera of the type shown in FIG. 5, 3-dimensional depth information may be obtained from captured images for objects such as object 205 and object 210 located within a short distance from the camera (i.e., in the near-field of the camera). As shown in FIG. 5, objects 205 and 210 will appear at different locations in images captured by image sensors 160A, 160B, and 160C, respectively, due to the physical offset of image sensors 160A, 160B, and 160C in camera 120. Far-field objects such as object 200, however, will appear in substantially the same position in images captured by image sensors 160A, 160B, and 160C. Thus, image depth information may only be obtained for objects located a distance less than distance 230 (i.e., the distance at which parallax P computed using equation (5) is less than or equal to 1). As discussed in connection with FIGS. 3 and 4, distance 230 is limited by the maximum physical separation of image sensors 160A, 160B and 160C. In addition, objects such as object 210 may be substantially a single color and therefore may saturate the pixels of one of image sensors 160A, 160B, or 160C (e.g. a red object may saturate the pixels of a red image sensor). In a typical array camera, image depth information may be destroyed due to this type of relative color saturation.

Figure 6:
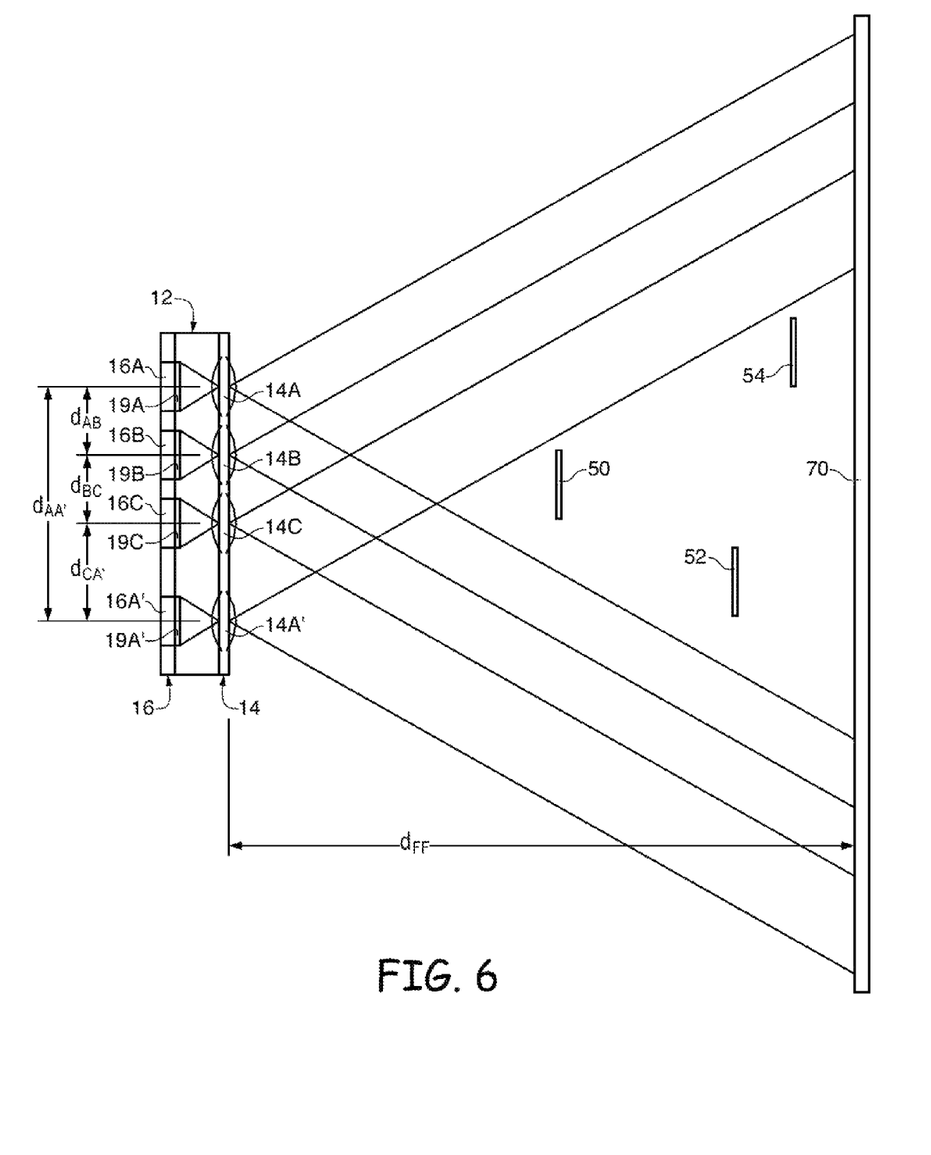
FIG. 6 is a cross-sectional side view of an illustrative camera module having a fourth image sensor and lens in accordance with an embodiment of the present invention.

FIG. 6 is a cross-sectional side view of an illustrative camera module such as camera module 12 of FIG. 1. As shown in FIG. 6, camera module 12 may be configured such that four image sensors such as image sensors 16A, 16B, 16C, and 16A' receive light through corresponding lenses 14A, 14B, 14C, and 14A', respectively. Lenses 14A, 14B, 14C, and 14A' may be focused at the hyper-focal distance resulting in the projected pixel image at infinity to be as sharp as the projected image at the closest usable range, resulting in the largest depth of field for the array camera 120. Using color filters such as color filters 19A, 19B, 19C, and 19A', respectively, image sensors 16A, 16B, 16C, and 16A' may be configured to be sensitive to light of various colors. For example, image sensor 16A may be a green image sensor (i.e., an image pixel array configured to receive light thorough a green color filter that allows green light to pass). In one acceptable arrangement, image sensor 16A may (as an example) be a green image sensor, image sensor 16B may be a red image sensor (i.e., an image pixel array configured to receive light thorough a red color filter that allows red light to pass), image sensor 16C may be a blue image sensor (i.e., an image pixel array configured to receive light thorough a blue color filter that allows blue light to pass) and image sensor 16A' may be a green image sensor having a green color filter (i.e., color filter 19A') matched to the green color filter of image sensor 16A (i.e., color filter 19A).

Another arrangement is possible in which (for example) image sensor 16A is a green image sensor, image sensor 16B is a blue image sensor, image sensor 16C is a red image sensor and image sensor 16A' is a green image sensor. Other arrangements in which image sensors 16A and 16A' are both red image sensors or (as another example) image sensors 16A and 16A' are both blue image sensors are also possible. Arrangements in which image sensors 16A and 16A' are matched (i.e., color filters 19A and 19A' allow light of the same colors to pass) are preferred so that image sensors that are sensitive to light of the same color have the largest physical separation while using the minimal amount of silicon. Providing camera module 12 with image sensors 16A and 16A' having substantially the same color sensitivity may also reduce the occurrence loss of depth information due to relative color saturation.

In another embodiment, image sensors 16A, 16B, and 16C may each be one of blue, red, or green image sensors while image sensor 16A' is a clear image sensor (i.e., an image pixel array with a clear element or other configuration that is free of color filters so that white light is received at the image pixel array). Providing image sensor array 16 with a fourth image sensor that is a clear image sensor may improve depth mapping and imaging capabilities in low-light conditions as no light is absorbed by the filter.

The physical separation of image sensors 16A and 16A' may be characterized by a linear distance $d_{AA'}$ (sometimes called a baseline distance), as shown in FIG. 6. The size of a parallax correction for objects such as objects 50, 52, 54, and 70 is proportional to distance $d_{AA'}$ and inversely proportional to the distance of the object from the camera module 120. The largest distance to which reliable depth information may be obtained by camera module 12 may be characterized by far-field distance $d_{FF}$. The far-field distance $d_{FF}$ is limited by the baseline distance $d_{AA'}$ as described in connection with FIGS. 3 and 4 and equations (1), (2), (3), (4), and (5) (i.e., far-field distance $d_{FF}$ is the distance beyond which parallax P of equation (5) is less than one). Distance information may be extracted from images captured by image sensors 16A, 16B, 16C, and 16A' for objects such as objects 50, 52, and 54 using processing circuitry 18. This is because near-field objects 50, 52, and 54 will appear at different positions in images capture by image sensors 16A, 16B, 16C, and 16A' due to the physical offsets between image sensor 16A, 16B, 16C, and 16A'. Far-field object 70, however, may appear at substantially the same position in images captured by image sensors 16A, 16B, 16C, and 16A' and therefore distance (or image depth) information cannot be extracted. It is therefore desirable to provide a maximum baseline distance $d_{AA'}$. This same feature, in which objects appear at different positions in images captured by image sensors that are physically offset from each other, is undesirable when combining single color images into color images. It is therefore also desirable to have distance $d_{AB}$ (between image sensor 16A and image sensor 16B) and distance $d_{BC}$ (between image sensor 16B and image sensor 16C) be similar to compared to the size of image sensors 16A, 16B, and 16C (e.g., substantially the same as or less than twice the size of image sensors 16A, 16B, and 16C). Providing a fourth image sensor such as image sensor 16A', allows a large baseline distance while preserving small distances between sensors used to produce color images.

As shown in FIG. 6, the physical distance $d_{AB}$ between image sensors 16A and 16B may be substantially the same as the physical distance $d_{BC}$ between image sensors 16B and 16C. The physical distance $d_{CA'}$ between image sensor 16C and image sensor 16A' may be substantially the same as distances $d_{AB}$ and $d_{BC}$ or may, if desired, be greater than distances $d_{AB}$ and $d_{BC}$. Baseline distance $d_{AA'}$ may, for example be approximately 7.5 mm, may be 4 to 12 mm, may be 6 to 9 mm, may be 7 to 8 mm, may be smaller than 7.5 mm or may be larger than 7.5 mm.

Figure 7:
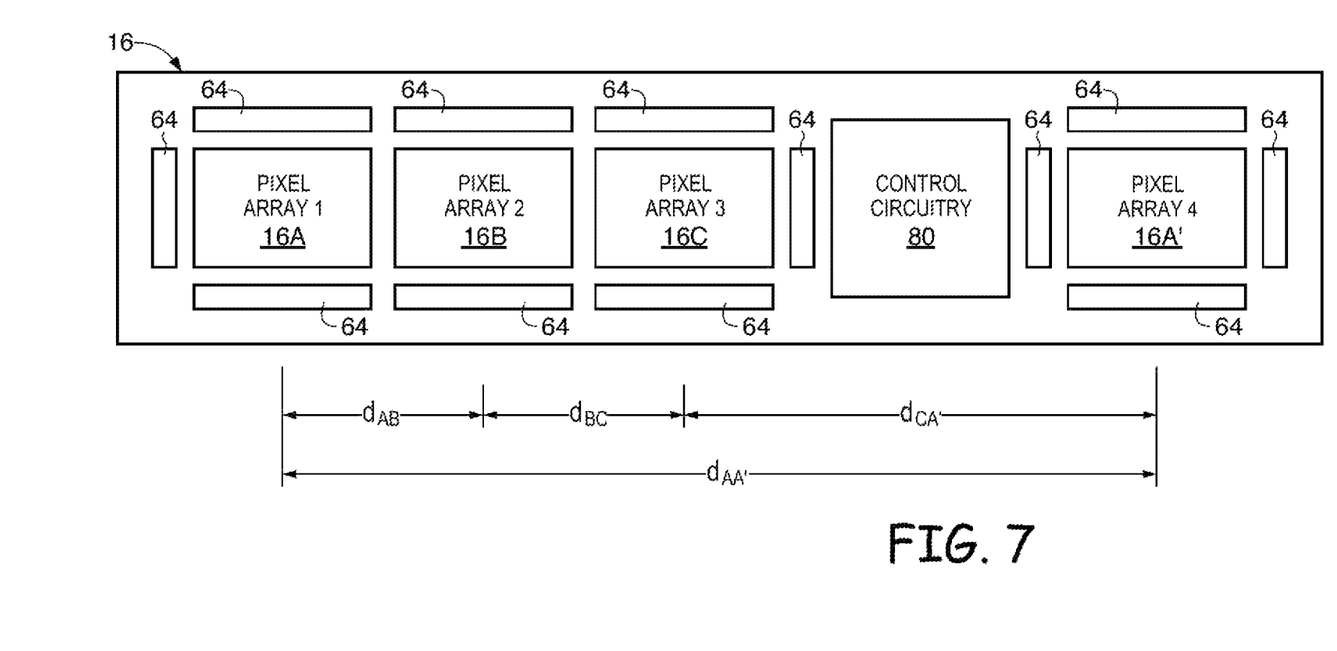
FIG. 7 is a top view of a horizontal image sensor array having a fourth image sensor for added depth information in accordance with an embodiment of the present invention.

FIG. 7 is a top view of an illustrative embodiment of image sensor array 16. In the embodiment of FIG. 7, horizontal image sensor array 16 may be formed from a single integrated circuit die (as an example). As shown in FIG. 7, image sensor array 16 may include (as an example) image sensor pixel arrays 16A, 16B, 16C, and 16A'. Each pixel array may have rows and columns of image pixels such as image pixel 190 of FIG. 2 or other suitable image pixels. Image sensor pixel arrays 16A, 16B, 16C, and 16A' may have any suitable resolution (e.g., 640×480, etc.). Image sensor pixel arrays 16A, 16B, 16C, and 16A' may have a long edge and a short edge. As shown in FIG. 7, image sensor array 16 may extend in the direction of the long edge of image sensors 16A, 16B, 16C, and 16A'.

Image sensor array 16 may also include support circuitry 64 (e.g., row select and control driver circuitry). Support circuitry 64 may be used to issue reset signals, row select signals, etc. for the image sensor pixel arrays. Support circuitry 64 may likewise be used for reading out image sensor data along associated output lines (such as output line 40 of FIG. 2).

In the example of FIG. 7, the physical distance $d_{AB}$ between image sensors 16A and 16B is substantially the same as the physical distance $d_{BC}$ between image sensors 16B and 16C. As shown in FIG. 7, the physical distance $d_{CA'}$ between image sensor 16C and image sensor 16A' may be greater than distances $d_{AB}$ and $d_{BC}$. In an arrangement in which distance $d_{CA'}$ is greater than distances $d_{AB}$ and $d_{BC}$, additional space may be provided on image sensor array 16 (i.e., additional space on the integrated circuit dye). The additional space on the integrated circuit dye may, if desired, be used to place additional control circuitry such as control circuitry 80. Control circuitry 80 may be used to provide additional support for issuing reset signals, row select signals, etc. or for reading out image sensor data along associated output lines (such as output line 40 of FIG. 2). Distance $d_{CA'}$ may also, if desired, be substantially the same as distances $d_{AB}$ and $d_{BC}$.

As described with respect to FIG. 6, image pixel arrays 16A, 16B, 16C, and 16A' of FIG. 7 may be configured to receive light of a given color. Various embodiments are possible in which image sensors 16A and 16A' are configure to receive light of the same color (e.g., both image sensors 16A and 16A' receive green light) while image sensors 16B and 16C are each configured to receive one of another color of light. Other embodiments may include arrangements in which image sensor 16A' receives white light (e.g., through a clear element) while image sensors 16A, 16B, and 16C each receive one of red, green or blue light, respectively.

Figure 8:
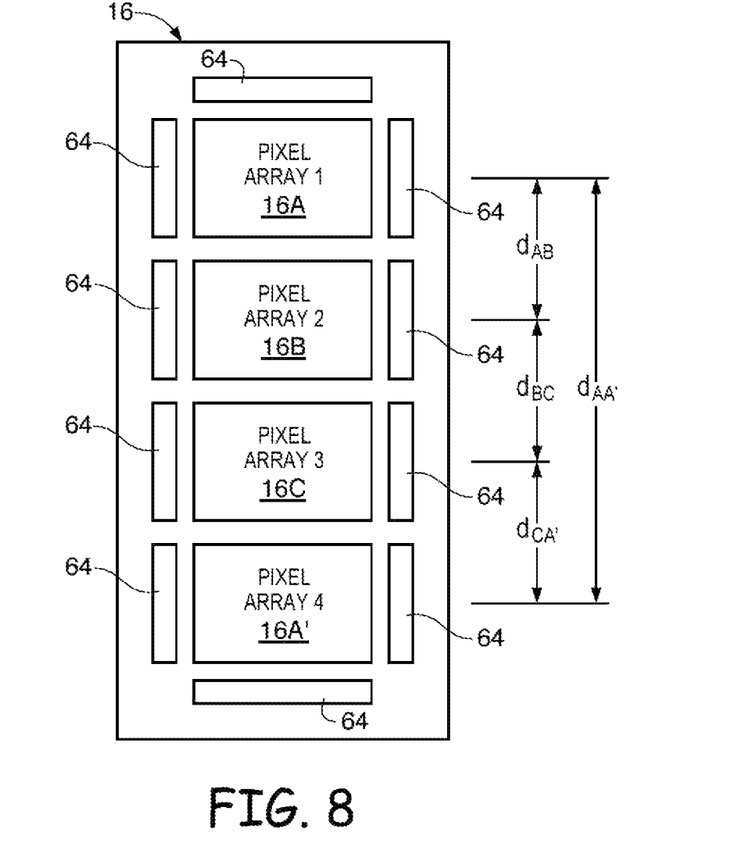
FIG. 8 is a top view of a vertical image sensor array having a fourth image sensor for added depth information in accordance with an embodiment of the present invention.

FIG. 8 is a top view of an illustrative embodiment of image sensor array 16. In the embodiment of FIG. 8, vertical image sensor array 16 may be formed from a single integrated circuit die (as an example). As shown in FIG. 8, image sensor array 16 may include (as an example) image sensor pixel arrays 16A, 16B, 16C, and 16A'. Each pixel array may have rows and columns of image pixels such as image pixel 190 of FIG. 2 or other suitable image pixels. Image sensor pixel arrays 16A, 16B, 16C, and 16A' may have any suitable resolution (e.g., 640×480, etc.). Image sensor pixel arrays 16A, 16B, 16C, and 16A' may have a long edge and a short edge. As shown in FIG. 8, image sensor array 16 may extend in the direction of the short edge of image sensors 16A, 16B, 16C, and 16A'.

Image sensor array 16 may also include support circuitry 64 (e.g., row select and control driver circuitry). Support circuitry 64 may be used to issue reset signals, row select signals, etc. for the image sensor pixel arrays. Support circuitry 64 may likewise be used for reading out image sensor data along associated output lines (such as output line 40 of FIG. 2).

In the example of FIG. 8, the physical distance $d_{AB}$ between image sensors 16A and 16B is substantially the same as the physical distance $d_{BC}$ between image sensors 16B and 16C. As shown in FIG. 8, the physical distance $d_{CA'}$ between image sensor 16C and image sensor 16A' may be substantially the same as distances $d_{AB}$ and $d_{BC}$. Distance $d_{CA'}$ may, if desired, be greater than distances $d_{AB}$ and $d_{BC}$. In an arrangement in which distance $d_{CA'}$ is greater than distances $d_{AB}$ and $d_{BC}$, additional space may be provided on vertical image sensor array 16 (i.e., additional space on the integrated circuit dye). The additional space on the integrated circuit dye may, if desired, be used to place additional control circuitry such as control circuitry 80. Control circuitry 80 may be used to provide additional support for issuing reset signals, row select signals, etc. or for reading out image sensor data along associated output lines (such as output line 40 of FIG. 2).

As described with respect to FIG. 6, image pixel arrays 16A, 16B, 16C, and 16A' of FIG. 8 may be configured to receive light of a given color. Various embodiments are possible in which image sensors 16A and 16A' are configure to receive light of the same color (e.g., both image sensors 16A and 16A' receive green light) while image sensors 16B and 16C are each configured to receive one of another color of light. Other embodiments may include arrangements in which image sensor 16A' receives white light (e.g., through a clear element) while image sensors 16A, 16B, and 16C each receive one of red, green or blue light, respectively. The embodiments described in connection with FIGS. 7 and 8 are merely illustrative and other embodiments may be used.

Various embodiments have been described illustrating array cameras that include arrays of image sensors and lenses for improved scene depth mapping. In particular, array cameras may have four lenses and four image sensors arranged along a straight line. Three of the four image sensors may be red, green, and blue image sensors for capturing color images. The fourth image sensor may be a clear image sensor, an additional green image sensor or other color image sensor. The fourth image sensor may be formed at a distance from the three color image sensors or adjacent to the three color image sensors. Providing a fourth image sensor that is a green image sensor creates a larger baseline distance for depth mapping and avoids relative color saturation issues compared with conventional array cameras. Providing a fourth image sensor at a distance from the three color image sensors creates an even larger baseline distance and therefore depth information may be obtained for even larger distances from the array camera than in a conventional array camera.

The foregoing is merely illustrative of the principles of this invention which can be practiced in other embodiments.

What is claimed is:

1. A camera module, comprising:
   an array of four lenses;
   an array of four color filters, wherein a first and a fourth color filter of the four color filters pass a first color of light, wherein a second color filter of the four color filters passes a second color of light that is different than the first color of light, and wherein a third color filter of the four color filters passes a third color of light that is different than the first color of light and that is different than the second color of light;
   an array of four image sensors each of which receives image light from a respective one of the four lenses through a respective one of the four color filters, wherein the array of four image sensors comprises a first pixel array that corresponds with the first color filter, a second pixel array that corresponds with the second color filter and that is formed adjacent to the first pixel array, a third pixel array that corresponds with the third color filter and that is formed adjacent to the second pixel array, and a fourth pixel array that corresponds with the fourth color filter and that is formed adjacent to the third pixel array, wherein the second pixel array is formed at a first distance from the first pixel array, the third pixel array is formed at the first distance from the second pixel array, and the fourth pixel array is formed at a second distance from the third pixel array, and wherein the second distance is larger than the first distance; and
   an image sensor integrated circuit die, wherein the image sensors are each formed as part of the image sensor integrated circuit die.

2. The camera module defined in claim 1 wherein the first and the fourth color filters are configured to pass green light.

3. The camera module defined in claim 2, wherein the second color filter is configured to pass red light and the third color filter is configured to pass blue light.

4. A camera module, comprising:
   first, second, third, and fourth lenses;
   an image sensor array having first, second, third, and fourth images sensors, wherein the first, second, third and fourth images sensors are configured to establish a first distance between the first and second image sensors, a second distance between the second and third image sensors, and a third distance between the third and fourth image sensors, wherein the third distance is larger than the first and second distances, wherein the first, second, third and fourth image sensors are configured to establish a fourth distance between the first and fourth image sensors, and wherein the fourth distance is equal to the sum of the first, second and third distances;
   a first color filter through which the second image sensor receives a first color of light;
   a second color filter through which the third image sensor receives a second color of light;
   a green color filter through which the first image sensor receives green light; and
   a clear color filter through which the fourth image sensor receives white light; and
   the image sensor array is formed as part of a common image sensor integrated circuit die.

5. The camera module defined in claim 4, wherein the first distance and the second distance are equal.

6. The camera module defined in claim 5, wherein the first color filter is a red color filter and wherein the second color filter is a blue color filter.

7. The camera module defined in claim 6, wherein the image sensor array comprises control circuitry formed in a space between the third image sensor and the fourth image sensor.

8. The camera module defined in claim 7, wherein the control circuitry is formed as part of the common image sensor integrated circuit die.

9. An electronic device, comprising:
   processing circuitry; and
   a camera module coupled to the processing circuitry, wherein the camera module comprises:
      first, second, third, and fourth lenses;
      first, second, third, and fourth corresponding images sensors, wherein the first, second, third, and fourth image sensors are formed along a straight line, wherein the second image sensor is located between the first and third image sensors, and wherein the third image sensor is located between the second and fourth image sensors;
      first, second, and third color filters through which the first, second, and third image sensors receive light, wherein the first, second, and third color filters include a red color filter, a green color filter, and a blue color filter, wherein the first, second, third, and fourth image sensors are mounted in the camera module so that there is a first distance between the first and second image sensors, a second distance between the second and third image sensors, a third distance between the third and fourth image sensors, wherein the first and second distances are equal, wherein the third distance is larger than the second distance, wherein the first color filter corresponds with the first image sensor, wherein the second color filter corresponds with the second image sensor, wherein the third color filter corresponds with the third image sensor, wherein the fourth color filter corresponds with the fourth image sensor, wherein the first color filter is the green color filter, and wherein the fourth color filter is a second green color filter; and
      an image sensor integrated circuit die, wherein the image sensors are each formed as part of the image sensor integrated circuit die.

10. The electronic device defined in claim 9, wherein the first, second, third, and fourth image sensors are mounted in the camera module so that there is a baseline distance between the first and fourth image sensors, wherein the baseline distance is equal to a sum of the first, second, and third distances.

11. The electronic device defined in claim 10, wherein the baseline distance is 4 to 12 mm.

* * * * *